Patent header / body

3,256,166
PHOTO-INITIATED GRAFT POLYMERIZATION OF CELLULOSIC COMPOSITIONS

Robert H. Pfeiffer, Wattwil, Switzerland, assignor to W. R. Grace & Co., Cambridge, Mass., a corporation of Connecticut
No Drawing. Filed June 27, 1961, Ser. No. 119,821
6 Claims. (Cl. 204—158)

This invention relates to a process for the production of graft copolymers using ultraviolet light as the initiator for the graft polymerization reaction.

A number of different processes have been developed in the past in which graft polymerization is initiated by means of ultraviolet light irradiation. In most of these processes, a polymeric substrate is irradiated in the presence of a monomer, either with or without the addition of substances which as as "activators" or "sensitizers" for the photochemical reaction. One such process, described in copending application No. 822,412, filed June 24, 1959, and now abandoned, involves the use of a polymeric substrate which contains active hydrogen atoms and a soluble anthraquinone derivative as the photosensitizer. In the preferred form of this process, a cellulosic substrate is first soaked in a water solution of a soluble salt of an anthraquinone disulfonic acid, after which the treated substrate is immersed in a vinyl monomer and irradiated.

The above-described process gives excellent yields of graft copolymer and in many ways is suitable for commercial application. The rate of the reaction can be increased to a workable commercial level by the use of suitable reaction conditions, particularly by the addition of a polar organic solvent to the liquid monomer for the purpose of increasing the rate of diffusion of the monomer into the polymeric substrate. The formation of homopolymer in this process, furthermore, is lower than in most ultraviolet-initiated graft polymerization processes developed in the past, and may be further reduced by the use of suitable process conditions to a negligible amount. The major obstacle to the use of this and other ultraviolet-initiated graft polymerization processes on a commercial scale has been the long induction period, i.e., the period which elapses between the time irradiation is started and the actual onset of the grafting reaction. These long induction periods are particularly undesirable if the grafting is to be carried out as a continuous process.

It is an object of my invention, therefore, to develop a method by which the induction period in ultraviolet light-initiated graft polymerization processes may be eliminated or substantially reduced.

I have discovered that the induction period may be greatly shortened if either of the major reactants in an ultraviolet light-initiated graft polymerization reaction, i.e., either the photosensitizer-treated polymeric substrate or the monomer, is first subjected to a preliminary period of irradiation with ultraviolet light. When the substrate and the monomer are then brought into contact with each other and are subjected to further irradiation, the graft polymerization reaction begins almost immediately, with little or no induction period. Thus, I am able to obtain substantial yields of graft copolymer in a considerably shorter time than is required in the processes of the prior art.

My invention will be more clearly understood by reference to the following examples:

Example I

A mixture of 62 parts by volume of styrene, 8 parts by volume of acrylonitrile and 30 parts by volume of acetone was divided into portions, placed in vesse's open to the atmosphere, and irradiated for periods of 10, 20 and 30 minutes between two high pressure mercury arc lamps producing exclusively light of wave length above 3000 A. Strips of cellophane, which had previously been weighed and then soaked for 20 minutes in a mixture of 50 parts by volume of dimethyl formamide and 50 parts by volume of a 0.2 M aqueous solution of the sodium salt of 2.7-anthraquinone disulfonic acid, were immersed in the monomer mixture and irradiation was continued for 15 minutes. The samples were removed from the monomer, washed in hot dimethyl formamide and hot water, dried and reweighed. The weight pickup due to graft copolymerization was as follows:

| Length of pre-irradiation, minutes: | Weight pickup, percent |
|---|---|
| 0 | 3.2 |
| 10 | 4.3 |
| 20 | 5.6 |
| 30 | 16.2 |

It is apparent from the very low yield of the sample which had not been pre-irradiated that the graft polymerization reaction had just barely started at the end of the 15 minute reaction period, or in other words that the induction period of this particular reaction was about 15 minutes. Pre-irradiation for periods of 10 to 20 minutes resulted in an almost negligible decrease of the induction period. Pre-irradiation of 30 minutes, however, produced a decided effect, with a grafting yield of 16.2 percent after a 15 minute reaction period. By contrast, in the conventional grafting process, with no pre-irradiation step, the reaction had to be carried on for about 30 minutes in order to achieve a yield of 16 percent.

The effectiveness of the process of Example I may be very greatly increased if a small amount of photosensitizer is dissolved in the monomer before the pre-irradiation step. The following example illustrates this procedure.

Example II

The monomer mixture of Example I was used. A few drops of a 0.1 M aqueous solution of the sodium salt of 2,7-anthraquinone disulfonic acid were added to the monomer mixture, and the mixture was first shaken and then allowed to stand for a few minutes. The photosensitizer solution, being only slightly soluble in the monomers, settled out and was separated from the monomer mixture. The monomers were then pre-irradiated for 10 minutes, after which a piece of cellophane which had been soaked for 30 minutes in a mixture of 50 parts by volume of dimethyl formamide and 50 parts by volume of a 0.1 M aqueous solution of the sodium salt of 2,7-anthraquinone disulfonic acid was immersed in the monomer mixture and irradiation was continued for 15 minutes. The weight pickup of the sample was 29.8 percent, compared with 4.3 percent for the 10 minute pre-irradiation sample of Example I. In the conventional graft polymerization process, using the same reactants but with no pre-irradiation step, furthermore, a reaction time of about 90 to 100 minutes was necessary in order to obtain a yield of about 30 percent of graft copolymer. Although the photosensitizer was so insoluble in the monomers that it did not even impart any color to the monomer mixture, nevertheless the small trace of sensitizer which was retained by the monomer mixture had a striking effect on the efficiency of the pre-irradiation step.

Example III

A weighed sample of cellophane was soaked for 30 minutes in a sensitizer solution containing 50 parts by volume of dimethyl formamide and 50 parts by volume of a 0.1 M aqueous solution of the sodium salt of 2,7-anthraquinone disulfonic acid. The cellophane was then dried between two sheets of filter paper and irradiated in air for 15 minutes. The pre-irradiated sample was again immersed in the sensitizer solution for a period of 5 minutes, after which it was removed, dried between two sheets of filter paper, immersed in a grafting solution containing 50 parts by volume of dimethyl formamide and 50 parts by volume of acrylonitrile in a vessel which was open to the atmosphere and irradiated for a further period of 20 minutes. The yield of graft copolymer, measured by weight pickup of the cellophane, was 25.7 percent. A sample of cellophane which had not been pre-irradiated showed a weight pickup of only 4.8 percent after 20 minutes reaction time, and it was necessary to continue the graft polymerization reaction for about 50 minutes in order to obtain a yield of about 25 percent of graft copolymer on the sample which had not been pre-irradiated.

The ultraviolet light irradiation, both in the pre-irradiation step and in the actual grafting step, is ordinarily carried out in a system which is open to the atmosphere, as in the above examples, since apparently some oxygen must be present in order for the anthraquinone sensitizer to be converted to its active form. When the sensitizer-treated substrate has been pre-irradiated in air, however, the grafting step may, if desired, be carried out in an inert atmosphere. This procedure is illustrated by the following example.

*Example IV*

The process of Example III was followed through the pre-irradiation step. The pre-irradiated sample was then washed in water to remove the sensitizer, immersed in a mixture of equal volumes of acrylonitrile and dimethyl formamide in a closed system and irradiated for 20 minutes in an atmosphere of nitrogen. The yield of graft copolymer was 17.8 percent of the original weight of the cellophane sample.

It is apparent from the above examples that pre-irradiation of either the monomer mixture or the polymeric substrate brings about a substantial decrease in the induction period of the ultraviolet-initiated graft polymerization reaction. In many instances, this results in a decrease in the total irradiation time, with the consequent savings in the cost of the process. In all cases where pre-irradiation is used, the actual grafting step, i.e., the irradiation of the substrate in the presence of the monomer, is substantially shortened and the possibility of loss of monomer through homopolymerization is thereby reduced. The most outstanding advantage of the process of my invention, however, is that the shortened induction period makes it considerably more practical to carry out the ultraviolet light-initiated graft polymerization reaction as a continuous process. Thus, for the first time, graft polymerization by means of ultraviolet light can be adapted to a rapid and workable commercial process.

The mechanism by which the pre-irradiation step shortens the induction period is not clearly understood. It is possible that pre-irradiation destroys, by a photo-oxidation process, the traces of polymerization inhibitors, such as catechols, hydroquinone, etc., which may be present even in highly purified monomers. Inhibiting substances in the substrate may also be destroyed during the pre-irradiation step. The photosensitizer, in addition, must be converted to a more active condition by absorption of the ultraviolet radiation before it can begin to play an effective role in the polymerization process. Pre-irradiation of even a small proportion of the sensitizer seems to increase the speed with which it is converted to its active state. Thus, in Example II the trace amount of sensitizer which was present in the monomer during the pre-irradiation step seems to have played a very important part in shortening the induction period of the reaction.

The pre-irradiation step of my invention may be applied to either the photosensitizer-treated substrate or the monomer, as shown in the above examples, or if desired both of the reactants may be subjected to pre-irradiation. This procedure is not ordinarily used, however, since it has little advantage over the pre-irradiation of either one of the major reactants.

The process of my invention may be carried out with any of the anthraquinone sensitizers or with any of the polymeric substrates disclosesd in copending application Serial No. 822,412, now abandoned. I may use, for example, other water soluble salts such as the potassium or ammonium salt of 2,7-anthaquinone disulfonic acid, 2-methyl-anthraquinone, 2-chloroanthraquinone, Indanthrene Yellow P.G. or Caldon Yellow 3G as the sensitizer; nylon, polyvinyl alcohol, amylose, and the various cellulose derivatives are among the polymers containing active hydrogen atoms which may be used as substrates in the graft polymerization reaction with anthraquinone sensitizers. Alternatively, the step of pre-irradiation may be applied to any of the ultraviolent light-initiated processes of the prior art, using any of the photosensitizers and any of the substrates of these processes.

The amount of pre-irradiation is not critical so long as it is sufficient to effect the desired reduction in the induction period. Both the length and the intensity of the pre-irradiation may be varied depending on the particular reactants, the reaction conditions and the effect which it is desired to obtain. If pre-irradiation of the sensitizer-treated substrate, however, is continued for periods which are much longer than those needed to eliminate the induction period, degradation of the substrate will occur. The use of excessive amounts of irradiation before the substrate is brought into contact with the monomer should therefore be avoided. The proper length and intensity of the pre-irradiation may be determined quite readily by means of simple experiment and do not, therefore, form a part of my invention.

The graft polymerization process of my invention may be carried out, in addition, using any vinyl monomers which may ordinarily be employed in graft polymerization reactions, as for example acrylonitrile, acrylamide, methyl methacrylate, acrylic acid, vinyl chloride, vinylidene choride, vinyl acetate, or styrene.

I claim:

1. In a process of graft polymerization in which a photosensitizer-treated cellulose substrate is subjected to irradiation with ultra-violet light while in contact with a vinyl monomer, the said photosensitizer-treated substrate and the said vinyl monomer being the major reactants in the process, the step of first irradiating at least one of the major reactants separately with ultraviolet light before the said reactants are brought into contact with each other, whereby the induction period of the graft polymerization process is substantially shortened.

2. The process of claim 1 in which the reactant which is subjected to preliminary irradiation is the photosensitizer-treated cellulose substrate.

3. The process of claim 1 in which the reactant which is subjected to preliminary irradiation is the vinyl monomer.

4. The process of claim 3 in which the vinyl monomer is treated with a minor amount of a photosensitizer prior to the preliminary irradiation, said photosensitizer being only slightly soluble in said monomer.

5. The process of claim 1 in which the photosensitizer is a water-soluble salt of an anthraquinone disulfonic acid.

6. A process of graft polymerization which includes the steps of soaking a cellophane film in a solution of the sodium salt of 2,7-anthraquinone disulfonic acid in a mixture of water and a polar organic solvent, treating a mixture of vinyl monomer and a polar organic solvent with a minor amount of the sodium salt of 2,7-anthraquinone disulfonic acid which is only slightly soluble in said monomer, subjecting the thus treated mixture to a preliminary period of irradiation with ultraviolet light in the presence of ambient air, bringing the soaked cellophane film into contact with the pre-irradiated monomer mixture, and thereafter subjecting the cellophane, while in contact with the monomer mixture, to irradiation with ultraviolet light in the presence of ambient air.

References Cited by the Examiner

UNITED STATES PATENTS

| | | | |
|---|---|---|---|
| 2,873,240 | 2/1959 | Miller | 204—158 |
| 2,907,675 | 10/1959 | Gaylord | 204—154 |
| 2,989,455 | 6/1961 | Neugebauer et al. | 204—158 |
| 3,001,922 | 9/1961 | Zimm | 204—154 |
| 3,058,950 | 10/1962 | Stanton et al. | 204—154 |
| 3,081,242 | 3/1963 | Smith et al. | 204—154 |
| 3,090,664 | 5/1963 | Cline et al. | 204—154 |

FOREIGN PATENTS

| | | |
|---|---|---|
| 750,923 | 6/1956 | Great Britain. |
| 845,690 | 8/1960 | Great Britain. |

MURRAY TILLMAN, *Primary Examiner.*

JOHN R. SPECK, JOHN H. MACK, *Examiners.*

H. S. WILLIAMS, W. L. BASCOMB,
*Assistant Examiners.*